US012645729B1

(12) United States Patent
Subramanian et al.

(10) Patent No.: US 12,645,729 B1
(45) Date of Patent: Jun. 2, 2026

(54) PROMPT TEMPLATE OPTIMIZATION WITH LANGUAGE MODELS

(71) Applicant: Amazon Technologies, Inc., Seattle, WA (US)

(72) Inventors: Shreyas Vathul Subramanian, Herndon, VA (US); Amey K Dhavle, Jersey City, NJ (US); Nithin Mahendran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/759,340

(22) Filed: Jun. 28, 2024

(51) Int. Cl.
*G06F 16/383* (2019.01)
*G06F 3/0482* (2013.01)

(52) U.S. Cl.
CPC .......... *G06F 16/383* (2019.01); *G06F 3/0482* (2013.01)

(58) Field of Classification Search
CPC .................................................... G06F 16/383
USPC ........................................................ 707/767
See application file for complete search history.

(56) References Cited

U.S. PATENT DOCUMENTS

| 2013/0346106 A1* | 12/2013 | Xiao ...................... G06Q 10/10 705/3 |
| 2018/0343082 A1* | 11/2018 | Xiong ................... H04L 1/0057 |
| 2022/0405336 A1* | 12/2022 | Lippe ................. G06F 16/9535 |
| 2024/0242040 A1* | 7/2024 | Cogswell ................ G06F 40/40 |
| 2024/0248438 A1* | 7/2024 | Kiuchi ............. G06Q 10/06393 |
| 2024/0351287 A1* | 10/2024 | Quinonez ............. G06F 3/1203 |
| 2025/0187614 A1* | 6/2025 | Naoom .................... G06N 7/01 |

OTHER PUBLICATIONS

Fernando, Chrisantha et al.; "Promptbreeder: Self-Referential Self-Improvement via Prompt Evolution"; Google DeepMind, Sep. 28, 2023; arXiv:2309.16797v1, 64 pages.
Malladi, Sadhika et al.; "Fine-Tuning Language Models with Just Forward Passes"; 37th Conference on Neural Information Processing Systems, Jan. 11, 2024; arXiv:2305.17333v3, 38 pages.
Pryzant, Reid et al., "Automatic Prompt Optimization with 'Gradient Descent' and Beam Search", Microsoft Azure AI, Oct. 19, 2023; arXiv:2305.03495v2, 12 pages.
Shin, Taylor et al.; "AutoPrompt Eliciting Knowledge from Language Models with Automatically Generated Prompts"; Nov. 7, 2020; arXiv:2010.15980v2, 15 pages.

(Continued)

*Primary Examiner* — Baoquoc N To
(74) *Attorney, Agent, or Firm* — Nicholson De Vos Webster & Elliott LLP

(57) ABSTRACT

Techniques for prompt template optimization with language models are described. In some examples, a prompt template optimization request to optimize a generative artificial intelligence model prompt template is received, the prompt template optimization request including an initial prompt template and an indication of a selected function, the selected function to implement at least a portion of a prompt template optimization workflow. The prompt template optimization workflow is processed with the selected function, the prompt template optimization workflow including one or more iterations of generating, evaluating, and selecting prompt template variants based at least in part on the initial prompt template to yield a final prompt template. The final prompt template is output.

20 Claims, 8 Drawing Sheets

(56)                        References Cited

OTHER PUBLICATIONS

Tian, Jacob-Jungi et al.; "Using Soft-Prompt Tuning to Evaluate Bias in Large Language Models"; Associate for the Advancement of Artificial Intelligence, Mar. 5, 2024; arXiv:2306.04735v2, 9 pages.
Yang, Chengrun et al.; "Large Language Models as Optimizers"; Google DeepMind, Apr. 15, 2024; arXiv:2309.03409v3, 42 pages.

* cited by examiner

300

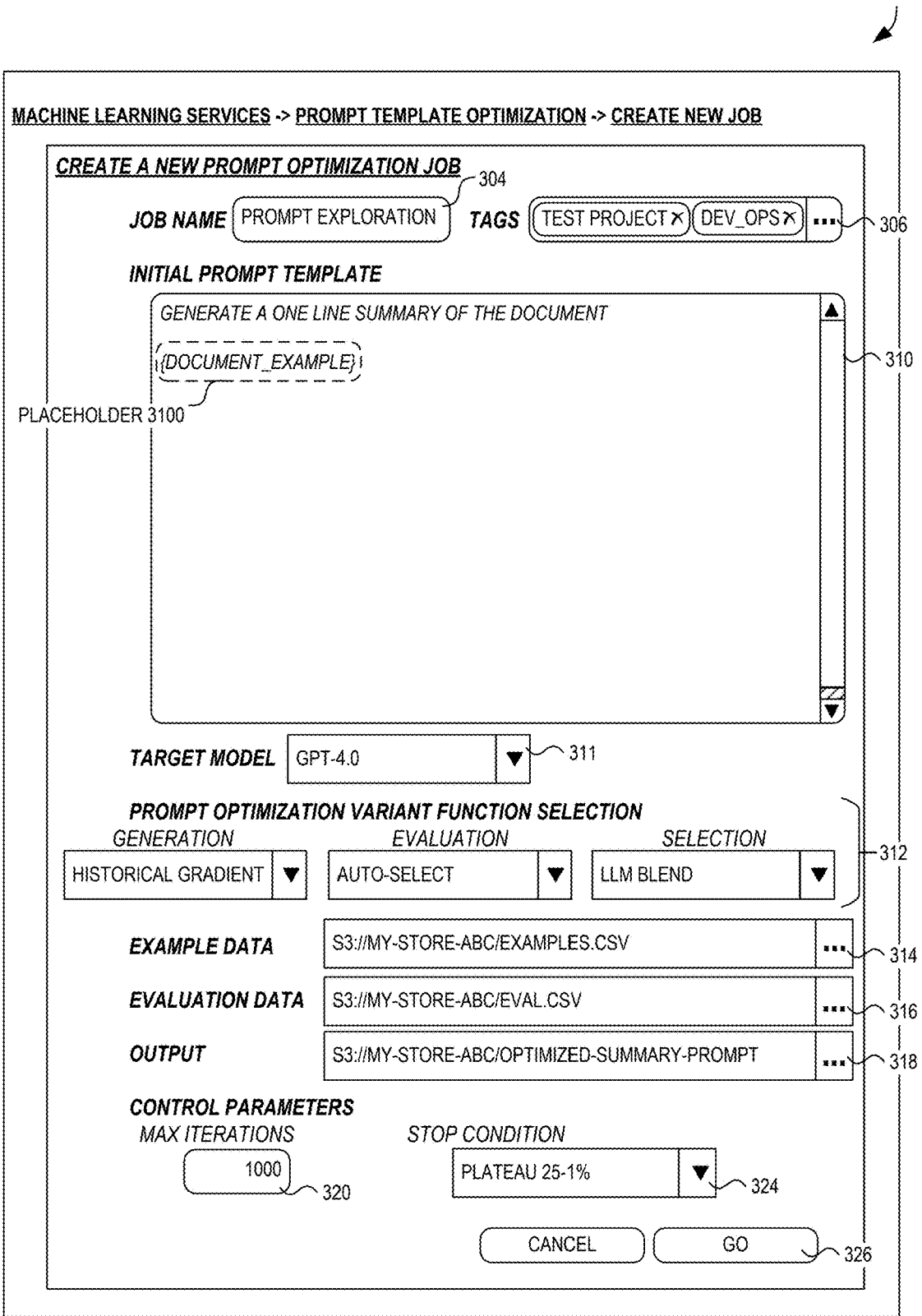

MACHINE LEARNING SERVICES -> PROMPT TEMPLATE OPTIMIZATION -> CREATE NEW JOB

CREATE A NEW PROMPT OPTIMIZATION JOB — 304

JOB NAME [ PROMPT EXPLORATION ]   TAGS ( TEST PROJECT ✗ )( DEV_OPS ✗ )( ••• ) ~ 306

INITIAL PROMPT TEMPLATE

GENERATE A ONE LINE SUMMARY OF THE DOCUMENT

{DOCUMENT_EXAMPLE}

PLACEHOLDER 3100

~ 310

TARGET MODEL [ GPT-4.0                    ▼ ] ~ 311

PROMPT OPTIMIZATION VARIANT FUNCTION SELECTION

| GENERATION | EVALUATION | SELECTION |
|---|---|---|
| HISTORICAL GRADIENT ▼ | AUTO-SELECT ▼ | LLM BLEND ▼ |

~ 312

EXAMPLE DATA   [ S3://MY-STORE-ABC/EXAMPLES.CSV         ••• ] ~ 314

EVALUATION DATA [ S3://MY-STORE-ABC/EVAL.CSV            ••• ] ~ 316

OUTPUT   [ S3://MY-STORE-ABC/OPTIMIZED-SUMMARY-PROMPT   ••• ] ~ 318

CONTROL PARAMETERS

MAX ITERATIONS          STOP CONDITION

[ 1000 ]                [ PLATEAU 25-1%        ▼ ] ~ 324
~ 320

( CANCEL )   ( GO ) ~ 326

FIG. 3

```
CREATE PROMPT OPTIMIZATION SOLVER JOB REQUEST 400
{
    "clientID": "user-xyz",                                    ← 402
    "jobName": "Prompt Exploration",                           ← 404
    "jobSpecification": {                                      ← 406
        "initialPromptTemplate": {                             ⎫ 408
            "text": "GENERATE A ONE LINE SUMMARY OF THE        ⎬
                    DOCUMENT\n\n{DOCUMENT_EXAMPLE}",           ⎭
        },
        "parameters": {                                        ⎫
            "iterationLimit": 1000,                            ⎬ 410
            "stopCondition": "plateau-25-0.5%"                 ⎭
        },
        "variantGeneration": "historical-gradient",            ← 412
        "variantEvaluation": "AUTO",                           ← 414
        "variantSelection": "LLM/blend"                        ← 416
    },
    "targetModel": "GPT-4.0",                                  ← 418
    "inputConfiguration": {                                    ⎫ 420
        "examplesStore": "MY-STORE-ABC",                       ⎬
        "examplesDataKey": "examples.csv",                     ⎬
        "evaluationStore": "MY-STORE-ABC",                     ⎬
        "evaluationDataKey": "eval.csv"                        ⎭
    },
    "outputConfiguration": {                                   ⎫ 422
        "outputStore": "MY-STORE-ABC",                         ⎬
        "outputKey": "optimized-summary-prompt",               ⎬
        "outputFormat": { "infer-from": "ExamplesData" }       ⎭
    },
    "tags": [ "Test Project", "Dev_Ops" ]                      ← 424
}
```

FIG. 4

JOB STATUS <u>500</u>

```
{
    "jobID": "job-a8x58S9",                           ← 502
    "jobName": "Prompt Exploration",
    "createdAt": "2024-05-30T15:49:00",        ⎫
    "startedAt": "2024-05-01T12:00:02",        ⎪
    "stoppedAt": null,                         ⎪
    "status": "running",                       ⎬ 504
    "executionTime": 0:30:40,                  ⎪
    "percentComplete": 65,                     ⎭
    "statusDetails": null,
    "executionLog": {                          ⎫
        "logStore": "MY-STORE-ABC",            ⎬ 506
        "logKey": "prompt-optimization-log"    ⎭
    }
}
```

FIG. 5

OPERATIONS
700

RECEIVING A PROMPT TEMPLATE OPTIMIZATION REQUEST TO OPTIMIZE A GENERATIVE ARTIFICIAL INTELLIGENCE MODEL PROMPT TEMPLATE, THE PROMPT TEMPLATE OPTIMIZATION REQUEST INCLUDING AN INITIAL PROMPT TEMPLATE AND AN INDICATION OF A SELECTED FUNCTION, THE SELECTED FUNCTION TO IMPLEMENT AT LEAST A PORTION OF A PROMPT TEMPLATE OPTIMIZATION WORKFLOW 702

PROCESSING THE PROMPT TEMPLATE OPTIMIZATION WORKFLOW WITH THE SELECTED FUNCTION, WHEREIN THE PROMPT TEMPLATE OPTIMIZATION WORKFLOW INCLUDES ONE OR MORE ITERATIONS OF GENERATING, EVALUATING, AND SELECTING PROMPT TEMPLATE VARIANTS BASED AT LEAST IN PART ON THE INITIAL PROMPT TEMPLATE TO YIELD A FINAL PROMPT TEMPLATE 704

OUTPUTTING THE FINAL PROMPT TEMPLATE 706

*FIG. 7*

PROMPT TEMPLATE OPTIMIZATION WITH LANGUAGE MODELS

BACKGROUND

Generative artificial intelligence models such as large language models (or just "language models") have demonstrated significant promise for a variety of tasks. Such models often include a natural language interface through which users submit prompts to elicit model responses. One of the drivers in the perceived and/or measurable quality of the response is the form and/or content of the prompt. Prompt characteristics such as the degree of detail or length of the prompt, the characterization of a desired output, the inclusion of in-context learning examples, and/or certain words or phrases can have significant impacts on the model output.

BRIEF DESCRIPTION OF DRAWINGS

Various examples in accordance with the present disclosure will be described with reference to the following drawings.

FIG. 3 illustrates a user interface that allows users to configure a prompt template optimization job, according to some examples.

FIG. 4 illustrates a request to create a prompt template optimization job directed to a programmatic interface of a prompt template optimization service, according to some examples.

FIG. 5 illustrates a job status output by a programmatic interface of the prompt template optimization service, according to some examples.

FIG. 7 is a flowchart illustrating operations of a method for prompt template optimization with language models according to some examples.

DETAILED DESCRIPTION

Figure 1:
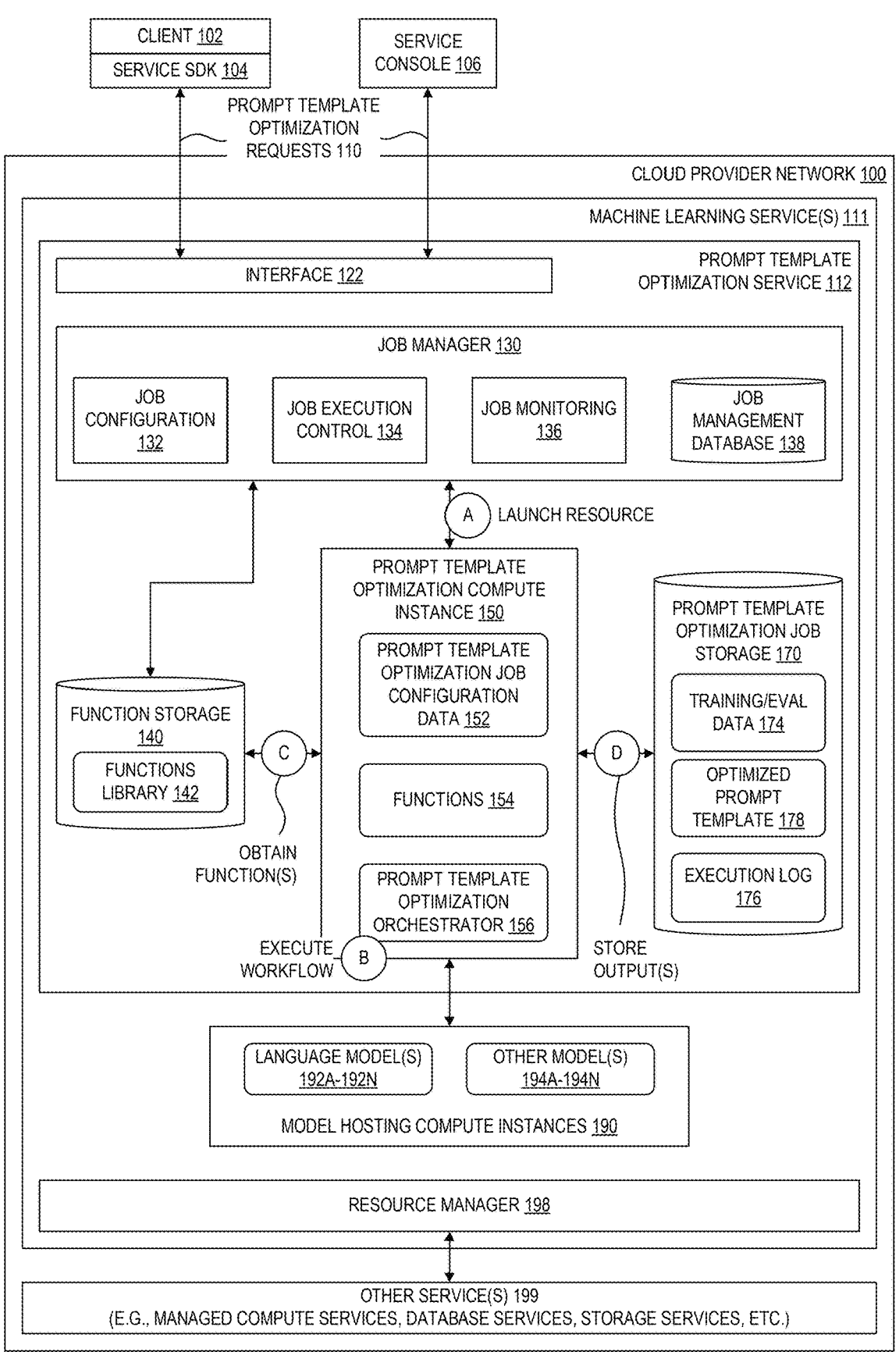
FIG. 1 is a diagram illustrating an environment for prompt template optimization with language models, according to some examples.

The present disclosure relates to methods, apparatus, systems, and non-transitory computer-readable storage media for prompt template optimization with language models. According to some examples, an optimizer, such as a cloud-based service, receives an initial user prompt template and leverages one or more language models to produce a new, improved prompt template. The optimizer can iteratively improve templates by repeating the process with the new prompt template as the starting prompt template. Users can customize the optimizer's workflow by selecting various functions to control the processing of different stages of the workflow. An exemplary set of stages include generating template variants, evaluating those variants, and selecting a "best" variant for continued iteration or as the optimized template to output as a result.

GAI models have demonstrated significant promise for a variety of tasks involving the generation of text, images, video, and/or audio. Such GAI models often present a natural language interface through which users can submit prompts to elicit the model's response. One of the main drivers in the perceived and/or measurable quality of the response is the form and/or content of the prompt. Prompt characteristics such as the degree of detail or length of the prompt, the characterization of a desired output, the presence (or absence) of in-context learning examples, and/or certain words or phrases can have significant impacts on the model output.

Prompt templates allow for the generalization of a prompt for a given class of tasks. For example, rather than re-create a prompt each time a user wants to summarize a document, develop a step-wise solution to a problem, generate an image, and so on, a prompt template can include general instructions for the task as well as placeholders in which to insert task-specific data. For example, a prompt template to summarize a document might be of the form "Generate a summary of the following document: {training_document_example}" where {training_document_example} is a placeholder for task-specific context. Another example might be a prompt template for software development. The prompt template might be of the form:

Architect am application for the following program requirements. You provide a definition of the various classes and methods in the application. Author code for the classes and methods using {programming_language}. Here are the program requirements:
{program_requirements}.
where {programming_language} and {program_requirements} are placeholders for task-specific context. In these examples, the prompt template includes one or more placeholders for task-specific details (in these examples, text offset by braces (that is, the '{' and '}') as well as prompt text that can be optimized (e.g., "Generate a summary of the following document" or "Architect an application for the following program requirements . . . ").

Given a natural language interface, the size of the solution space for GAI model prompts is significant. While techniques such as chain-of-thought prompting (e.g., including the phrase "let's think step-by-step" in a prompt) and few-shot learning (e.g., by including some sample prompt-response pairs in a prompt) have been developed and demonstrated to improve GAI model responses, it is challenging to systematically evaluate different and new prompts. As a result, end users often engage in manually modifying their prompts in an effort to improve the resultant responses.

To address these and other problems in the state of the art, examples of a prompt template optimizer are disclosed herein to enable users to easily optimize their prompt templates. Such an optimizer, also referred to herein as an "orchestrator," can iteratively generate, evaluate, and select prompt variants to improve an initial prompt template for some threshold number of iterations or until an earlier stopping condition is reached. The optimizer leverages a language model (e.g., an LLM) for one or more of the operations associated with generating, evaluating, and selecting candidate variants (or "candidates"). Through one or more iterations, the optimizer can identify and output an optimized prompt template.

The optimizer can execute an iterated workflow including example stages of (1) variant generation in which variants of an initial iteration prompt are generated, (2) variant evaluation in which the GAI model outputs from the generated variants are scored, and (3) variant selection in which a variant is selected (either to initialize the next iteration or as the final "optimized" prompt). The various functions at each stage can be modularized to enable users to select amongst various approaches to each stage, thereby customizing the prompt optimization workflow for their specific use case or requirements. In this manner, the service allows users to easily perform custom prompt optimization and solution space exploration via a common interface. In some examples, the selection of one or more approaches is reserved to the service, with the orchestrator selecting a particular approach for one or more of the stages.

As will be appreciated by those skilled in the art, examples of the prompt template optimization techniques disclosed herein are implemented in computer systems to solve existing technical problems in the state of the computing field and to improve the functioning of the current computer systems. In some examples, the optimizer is an application executed on one or more computer systems. In some examples, the optimizer is instantiated by a prompt template optimization service of a cloud provider network. The prompt template optimization service can service prompt template optimization requests from multiple customers and leverage existing hosted GAI models, including LMs such as LLMs, within the cloud provider network. These and other features and advantages of the disclosed system are discussed in further detail below, in connection with the figures.

FIG. 1 is a diagram illustrating an environment for prompt template optimization with language models, according to some examples. Here, prompt template optimization is offered as a service of a cloud provider network 100. The prompt template optimization service 112 can be part of a suite of machine learning services 111 including other offerings such as model training and hosting. Briefly, the prompt template optimization service 112 provides users with the ability to customize a prompt template optimization workflow by selecting from various functions that change how stages of the optimization workflow are performed. An exemplary set of stages include generating prompt template variants, evaluating the generated variants, and selecting a generated variant based on its evaluation (for further iteration or as the final output). The prompt template optimization service 112 can then allocate cloud resources (e.g., a compute instance 150) to execute the workflow. An orchestrator 156 executes the customized optimization workflow using the allocated resources, leveraging one or more models 192, 194 hosted by (typically) other cloud resources such as compute instances 190. Such models are often built using neural networks or artificial neural networks, where the model parameters represent weights and biases for individual "neurons." Language models 192 can include general or specialized language models such as GPTs, GPTs as modified by adapters, fine-tuned language models, models with similar architectures but different parameters, and so on. Other models 194 can include other models with natural language interfaces that generate other format outputs such as images, video, audio, and so on. Through one or more iterations of the stages, the orchestrator 156 can generate an "optimized" prompt template.

A cloud provider network (also referred to herein as a provider network, service provider network, multi-tenant provider network, or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Cloud provider networks provide users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. Cloud provider networks are sometimes "multi-tenant" as they can provide services to multiple different customers using the same physical computing infrastructure; for example, virtual machine instances may be concurrently hosted for different customers using a same underlying physical host computing device.

To provide computing resources as services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

The users (or "customers") of cloud provider networks 100 can use one or more user accounts that are associated with a customer account, though these terms can be used somewhat interchangeably depending upon the context of use. Such users can also include "internal" customers which can and often do include other services. In this manner, various low-level services such as virtualized compute and storage services can be used as building blocks in other more advanced or specialized services.

As illustrated, the cloud provider network 100 includes other services 199. Other services 199 can include compute services offering virtual machines, containers, or the like; storage services offering block- or object-level storage; database services offering SQL or NoSQL type databases, and so on. In addition to providing resources to external customers, these other services 199 can also be leveraged by other internal customers. These internal customers may be other services of the cloud provider network such as the prompt template optimization service 112 and/or machine learning services 111.

Users can interact with a cloud provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Users can interact with the prompt template optimization service 112 in various ways, generally via an interface 122 (e.g., an API). As illustrated, interface 122 can support prompt template optimization requests 110 from a client 102 or a service console 106. In some examples, the client 102 can be implemented as a remote application that embeds a service software development kit (SDK) 104, which is adapted to send prompt optimization requests 110 to the interface 122. In some examples, the service console 106 can be provided to users through a web-based interface accessed via a web browser allowing users to submit prompt template optimization requests 110 to the interface 122. Whether the client 102 or service console 106, the user interface can be a command line interface (CLI), a graphical user interface (GUI), a GUI with an integrated CLI, etc.

In the illustrated example, the prompt template optimization service 112 includes a job manager 130. The job manager 130 manages jobs corresponding to individual prompt template optimization requests. In some examples, the job manager 130 may hide certain details of an optimization run from clients such as the underlying compute resources used in processing the request. However, in some examples, the client may have control over the type of compute resource used to run a job (e.g., selection a virtual machine or container, the performance specifications associated with the selection, etc.). The prompt template optimization service 112 is typically a multi-tenant service that is used by many clients at the same time, and individual prompt optimization jobs are isolated from one another in separate execution environments. In some examples, the prompt template optimization service 112 does not return an immediate solution to a prompt template optimization request 110. Rather, the service will schedule the job for execution, and an asynchronous notification is provided to the client when a job is completed.

In some examples, the job manager 130 may implement a job configuration component 132 tasked with various aspects related to the configuration of prompt template optimization jobs in the service 112. For example, the job configuration component 132 may initially create a job configuration data object based on a prompt template optimization request 110. The job configuration data object may be stored as job configuration data in a job management database 138 maintained by the service 112 and provided by an underlying database service 199 of the cloud provider network 100. In some examples, each job configuration is assigned a unique identifier that can be used to associate various resources with a given job during processing or even by users to access, edit, and re-run existing jobs that have been persisted in the job management database 138 after completion. For example, the prompt template optimization service 112 may maintain previous jobs for some duration (e.g., six months, a year), and the interface 122 can provide users with the ability to obtain a listing of their previous jobs and to select and edit or otherwise copy prior job parameters. Such an identifier can be assigned in response to a prompt template optimization request 110 and subsequently provided to a user.

Different examples of the job configuration data stored in the job management database 138 can include different types of information about a prompt template optimization job. Exemplary information includes a job name, status, tags to categorize or label the job, an initial prompt template, a target GAI model, one or more selected optimization functions to customize the optimization process, data locations for input and output data, optimization parameters such as stop conditions, and so on.

In some examples, the job configuration component 132 can respond to interface 122 requests for a listing of the functions in the functions library 142 available to customize stages of a prompt template optimization workflow. The functions library 142 can be stored in a datastore, such as the function storage 140. Additional details on various functions are provided with reference to FIG. 2.

As shown, in some examples, the job manager 130 may implement a job execution control component 134. The job execution control component 134 can be configured to control the execution of jobs in the service 112, for example, the launching and termination of compute resources to process prompt template optimization jobs. In some examples, the job execution control component 134 may allow a user to explicitly launch or stop a prompt template optimization job. To launch a prompt template optimization job, the job execution control component 134 may send resource requests to a resource manager 198 responsible for provisioning and deprovisioning resources for processing jobs of the prompt template optimization service 112. (In this example, the resource manager 198 may be a component of the machine learning service(s) 111 that also manages compute resources for other machine learning services.)

As shown, in some examples, the job manager 130 may implement a job monitoring component 136. This job monitoring component 136 may be tasked with monitoring the status of prompt template optimization jobs that are currently pending or running in the prompt template optimization service 112. In some examples, job status data about jobs are written to the job management database 138 by the compute resources that are executing the jobs (e.g. compute resource instance 160). Such job status information may be made available to users via the interface 122. Depending on the example, the job status data may indicate information such as the identifier of a prompt template optimization job, timestamps of when the job execution was started or stopped, the execution time of the job, the current status of the job, a progress of the job (e.g. percentage completion), and the location of the execution log generated by the job.

As indicated, the resource manager 198 can manage the provisioning and deprovisioning of compute resources to support prompt template optimization jobs. (The operations of allocating and freeing resources for a particular task can be referred to with various terminology including provisioning and deprovisioning, launching and termination, allocating and releasing, etc.). The resource manager 198 can provide an interface for the prompt template optimization service 112 to access other services 199 of the cloud provider network 100. One such service may be referred to as a "managed compute service" that executes code or provides computing resources to requestors (e.g., users, services) in a managed configuration. Examples of managed compute services include, for example, a hardware virtualization service, a container service, or the like.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

While FIG. 1 depicts prompt template optimization as performed in a cloud environment within virtualized environments such as VMs and containers, other examples of prompt template optimization can be performed outside of the cloud (e.g., on a personal computer, by a server on a workplace intranet, etc.) and/or using non-virtualized environments (e.g., executed by a computer system without any virtualization such as described above between an operating system and the computer system).

An exemplary set of prompt template optimization operations is now described with reference to the encircled letters A through D in FIG. 1. At circle A, the job manager 130 launches a compute resource to execute an orchestrator 156 running a prompt template optimization workflow. As described above, this may be carried out by the job execution control component 134 requesting the launch from the resource manager 198. The request can identify a virtual machine or container image that includes software such as a prompt template optimization orchestrator 156 (or just "orchestrator").

As part of or after the launch of the compute instance 150, the job manager 130 can provide the compute instance 150 with prompt template optimization job configuration data 152. Exemplary configuration data 152 can include an identifier assigned to the job, the initial prompt template, an identification of the selected function(s) to customize the optimization workflow, stopping condition(s), a target model, locations of input data such as training and/or evaluation data, locations for output data, etc. The job configuration data 152 can be provided as environment variables initialized within the environment of compute instance 150, as a configuration file written to storage accessible to the compute instance 150, via an API of the orchestrator 156, etc.

At circle B, the orchestrator 156 executes the prompt template optimization workflow. Additional details on an exemplary workflow as executed by the orchestrator 156 are provided with reference to FIG. 6. Briefly, the workflow can be a series of operations (or "stages") customizable by user-selected functions, thereby allowing customization of the optimization process. Exemplary stages include prompt template variant generation, variant evaluation, and variant selection. Such a workflow may be authored in a variety of programming languages, one common one being the Python programming language. A top level workflow may call variant generation, variant evaluation, and variant selection, the code for each of which can vary depending on the user's selections. Other examples include compiled programs with external libraries including the selectable functions, etc.

In some examples, as part of the prompt template optimization workflow, the orchestrator obtains the selected functions identified in the prompt template optimization job configuration data 152 from function storage 140, as indicated at circle C. The orchestrator can retrieve the selected functions from functions library 142 and store them locally on the compute instance 150 as functions 154. While obtaining functions in this manner may increase job startup latency, it increases the flexibility of the service as orchestrators can dynamically load new functions as they are added to the functions library 142. In other examples, the prompt template optimization service 112 may maintain a set of images such as virtual machine or container images, each having a different combination of functions pre-loaded such that functions 154 are available upon instance launch. Such a setup can improve the startup latency of jobs at the cost of having to create and remove images as the set of user-selectable functions changes. In yet other examples, the functions library 142 may be pre-loaded in the image from which compute instances are launched, subject to the size of the functions library 142 fitting within the available resources of launched compute instances (e.g., the amount of available storage).

In some examples, the selection of specific functions for the one or more of the prompt optimization workflow stages may originate from a user selection via a user interface such as a CLI or GUI. In other examples, the selection of the function for one or more stages may be hidden from the user, with orchestrator 156 automatically selecting functions. For example, the orchestrator 156 can prompt a language model 192 to infer and classify the task of a given prompt template within a taxonomy. Given the class, the orchestrator 156 can have a set of rules or heuristics that identify a function for given workflow stage(s). In yet other examples, the selection may be surfaced to a user via the user interface, including an option of the aforementioned auto-selection.

At circle D, the orchestrator 156 can access prompt template optimization job storage 170 to obtain input data to the workflow and to store output data from the workflow. Exemplary input data includes training/evaluation data 174 that can be used by various stages of the prompt template optimization workflow, while exemplary output data can include the "final" or "optimized" prompt (e.g., once a stopping condition has been reached) as well as an execution log 176 that can capture data such as execution performance data, intermediate prompt variants, evaluations, and selections, etc. Job storage 170 can be provided by other services 199 (e.g., object- or block-level storage).

Training/evaluation data 174 can include samples, samples with associated labels or ground-truths, or some combination of both. For example, for a prompt template used in classification, the training data can include examples to be classified as well as their corresponding classification label (e.g., 0 or 1 for binary classification tasks; happy, sad, neutral for sentiment analysis tasks, etc.).

Training/evaluation data 174 can be provided in a form such that the orchestrator 156 can map the data contained therein into pre-defined placeholders either within a prompt template or within a meta-prompt template (described below). The training/evaluation data may include variable names (e.g., training_example, example_score) in a header row of a csv file identifying the position of the corresponding examples in subsequent rows or as names of objects such as in a JSON file. The orchestrator 156 can then use the variable names to parse and extract training data for populating placeholders in the prompt template during a training optimization workflow. For example, for a document summarization task, training data can include example documents, example summaries, and associated summary scores.

In some examples, as the orchestrator 156 executes, it can report the progress and/or status of the prompt template optimization workflow to the job monitoring component 136 (e.g., either automatically such as when certain operations complete or in response to a status request from the job monitoring component 136).

After the prompt template optimization workflow completes, the orchestrator 156 can report the completion to the job manager 130. Completion can occur when a stopping condition is reached, such as when the prompt template achieves a level of performance, has a performance plateau, a maximum number of iterations, etc. The job execution control component 134 can then terminate the compute instance 150 with the resource manager 198.

Figure 2:
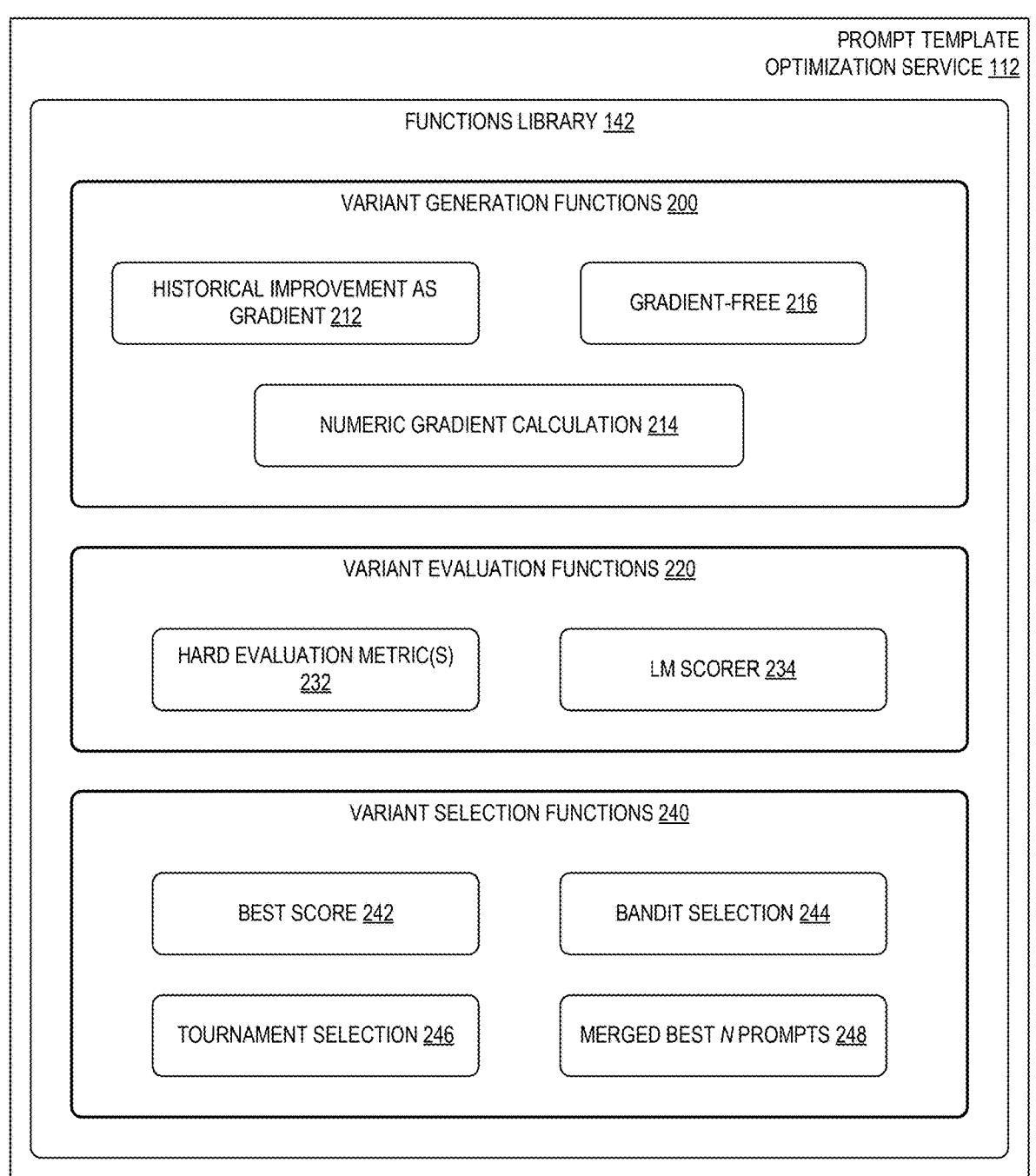
FIG. 2 illustrates a set of selectable functions for prompt template optimization, according to some examples.

FIG. 2 illustrates a set of selectable functions for prompt template optimization, according to some examples. As indicated above, an exemplary prompt template optimization workflow can include three stages: variant generation, variant evaluation, and variation selection. This process breakdown is an example, other workflows with more, fewer, and/or different stages of prompt template optimization process can be used. The prompt template optimization service 112 can offer one or more functions that customize each stage of the workflow breakdown. In this example, the functions library 142 can include variant generation functions 200, variant evaluation functions 230, and variant selection functions 240.

Functions that engage a language model (e.g., prompt the language model with a prompt and process the response) a "meta-prompt" and instructions for populating the meta-prompt and calling the language model. In this context, a meta-prompt template is a prompt template that includes instructions regarding the task of function and placeholders for task-specific data such as the prompt template being optimized, training examples, etc. An exemplary meta-prompt template for use in a simple variant generation function is shown below.

1 Generate and improvement of the following prompt template. Do not change any placeholders within the prompt template. The placeholders begin and end with braces { }.
2 Here is the prompt template.
3 [[prompt_template]]
4 Here is an example of another prompt that works well.
5 [[example_prompt]]
6 Your response should include only the improved prompt template In the above meta-prompt template, lines 3 and 5 include meta-prompt placeholders (demarcated here with double brackets '[[' and ']]' but more generally modified to be or defined as a different syntax than the prompt template placeholders). Lines 1, 2, 4, and 6 include instructions of the meta-prompt, including an instruction to preserve the prompt template placeholders (not shown, demarcated with bracers, for example).

During a variant generation stage of a prompt template optimization workflow, the orchestrator 156 can insert an initial prompt template into the meta-prompt placeholder of line 3 (e.g., a user provided prompt template in the first iteration or a result from the previous iteration in the workflow in subsequent iterations) and an example from the training/evaluation data 174 into the meta-prompt placeholder of line 5. The orchestrator can then submit the prompt to a language model and parse the response to obtain the generated variant for subsequent evaluation. By repeating this process with multiple examples (or even different combinations of examples, if the meta-prompt template includes multiple examples), the orchestrator 156 can obtain multiple variants from the initial prompt template of this iteration.

Similarly, with the generated prompt template variant including the persisted placeholders from the prompt template, the orchestrator 156 can insert examples from training/evaluation data 174 into the prompt template placeholders, submitting variants with different training and/or evaluation data to a target model (which may be the same language model used to generate the variants) to obtain the model's response to the variants.

In some examples, the prompt template optimization service 120 offers a plurality of variant generation functions 200 for prompt template optimization. At a high level, variant generation functions 200 include instructions that generate multiple prompt template variants from an initial prompt template, which again may be the user provided prompt template for a first iteration and a selected prompt template from the previous iteration for iterations after the first.

Exemplary variant generation functions 200 include a historical-improvement as gradient 212 function, a numeric gradient calculation 214 function, and a gradient-free 216 function. An example of the historical-improvement as gradient 212 function includes a meta-prompt having meta-prompt placeholders for an initial prompt template to improve, for prior iterations of the prompt template and associated scores of those iterations, and for one or more examples. The orchestrator 156 can track prior iterations of the prompt template and associated scores (e.g., from the evaluation stage) and expand the set of prior prompt templates and associated scores as iterations inserted at that meta-prompt placeholder. In some examples, the orchestrator may limit the number of historical prompts and scores to a limit (e.g., the prior ten iterations). The meta-prompt can further include an instruction to improve the initial prompt template given the trajectory of past prompt templates and example(s).

An example of the numeric gradient calculation 214 function would prompt a target language model with the prompt template populated with training data (e.g., for the summarization task, a sample document and associated summary in the training data). By comparing the response from the model to the summary in the training data via a loss function, the numeric gradient calculation 214 function can use backpropagation to identify and adjust tokens in the initial prompt template.

An example of the gradient-free 216 function includes a meta-prompt having meta-prompt placeholders for both an initial prompt template to improve and some number of example prompts, and an instruction to generate multiple prompt variants of the prompt template based on the examples provided.

In the case of variant generation functions using a meta-prompt such as the gradient-free 216 function and the historical-improvement as gradient 212 function described above, the instructions included in the meta-prompt may be fixed. In other examples, the meta-prompt may permit modification of the meta-prompt itself, generally preserving the meta-prompt placeholders.

In some examples, the prompt template optimization service 120 offers a plurality of variant evaluation functions 220 for prompt template optimization. At a high level, the orchestrator 156 can obtain the responses from the target model for each of the prompt template variants in a given iteration, the prompt template variants populated with sample data from the training/evaluation data 174. The variant evaluation functions 220 include instructions that score the model output, with the score serving as a score of the prompt template that produced the output. The scoring may be objective (e.g., based on ground-truth data in the training/evaluation data 174, based on an objective metric) or subjective (e.g., based on a model's evaluation of the output given the prompt).

Exemplary variant evaluation functions 220 include various hard evaluation metric 232 functions and an LM as scorer 234 function. Hard evaluation metrics evaluate a model output given a prompt template populated with samples in the training/evaluation data 174 against associated an associated ground truth of the sample or with a deterministic way of evaluating the output (e.g., cosine similarity between a document and summary, the MSE between images, etc.). The scoring of the model output is then used as a proxy for the performance of the associated prompt template.

Exemplary hard evaluation metrics include the F1 score that evaluates precision and recall, MSE (mean squared error), ROUGE scores (Recall-Oriented Understudy for Gisting Evaluation), Cross Entropy Loss, etc. As will be appreciated by those skilled in the art, the application of different hard evaluation metrics may be applied depending on the underlying task in the prompt template (e.g., MSE may be used for a prompt template used to perform image generation tasks, cross entropy loss or F1 for prompt templates used to perform classification tasks, ROUGE for prompt templates used to perform text summarization tasks, and so on). Different versions of a given metric may be adapted for different output forms.

An example of the LM as scorer 234 function uses an evaluation prompt template having placeholders for the prompt template under evaluation and its associated output for a given training sample. The evaluation prompt template can include the instruction to evaluate the quality and effectiveness of the prompt given the sample and the associated output on a scale (e.g., from 1-10).

The various variant evaluation 220 functions can include instructions to evaluate a prompt template using a minibatch of the training/evaluation data 174 (e.g., a randomly selected set of samples for a group of variants). The resulting score for a given prompt template can be calculated as a function (e.g., the mean score, the total score, etc.) of the individual scores of the outputs for the samples given that prompt template.

In some examples, the prompt template optimization service 120 offers a plurality of variant selection functions 230 for prompt template optimization. At a high level, variant selection functions 230 select a prompt template variant as the next initial prompt template for a subsequent iteration (or as the final "optimized" or "best" prompt template when a stopping condition is reached).

Exemplary variant selection functions 230 include a best score 242 function, a bandit selection 244 function, a tournament selection 246 function, and a merged best N prompt 248 function.

An example of the best score 242 function is a function that ranks the prompt template variants based on their associated scored from the variant evaluation stage and selects the prompt template having the highest score.

An example of the bandit selection 244 function includes instructions that performs an evaluation of the prompt template variants in parallel over samples in the training/evaluation data 174. As certain prompt template variants exhibit better performance than others (e.g., score higher over sample evaluations), those prompt template variants continue in the parallel evaluation while other, lesser performing variants are discarded, reducing the overall training cost in identifying the prompt template variant exhibiting the best performance.

An example of the tournament selection 246 function involves the head-to-head comparison of prompt template variants in a bracket style elimination. Prompt template variant scores are evaluated relative to one another with the winner advancing to the next round in the bracket.

An example of the merged best N prompts 348 function selects a prompt synthesized by a language model from the top N prompt variants of the current iteration. For example, a prompt template for this function may state, "Harmonize the following prompt templates into a single, improved prompt. [[prompt_template_variant_1]] [[prompt_template_variant_2]]. In the improved prompt, include one and only one of each of the prompt template placeholders demarcated by braces." Note that this function may be run after other selection functions (e.g., where the other selection function, such as the ranking of scores, the bandit or tournament style selections are used to identify the best N prompts).

Note that in some examples, the above described orchestrator 156 obtaining the responses from the target model for various prompt templates variants may be deferred until the variant selection stage. Such may be the case where prompt templates are evaluated relative to one another (e.g., the bandit and tournament style selection functions described above). In such cases, the variant selection stage may iteratively call a variant evaluation stage to process samples and generate scores for the prompt template variant(s) being evaluated for selection.

FIG. 3 illustrates a user interface 300 that allows users to configure a prompt template optimization job, according to some examples. The example user interface 300 may be presented via the service console 106 or via the client 102. Although presented as a graphical user interface, various elements (e.g., menus, fields, buttons, etc.) can correspond to CLI command parameters as will be appreciated by those of skill in the art.

As shown in this example, the user interface 300 includes a field 304 allowing a user to enter a name for the job.

As shown, the user interface 300 includes a field 306 allowing a user to tag the job being created. Such tags may be pre-defined by the user's organization or custom tags and useful as a filtering mechanism when browsing through a list of many jobs, to track charges associated with compute and storage for a given job, etc.

As shown, the user interface 300 includes a field 310 in which the user can provide the prompt template to be optimized. As shown, the example template includes a placeholder 3100 demarcated by braces. The particular syntax of placeholders within a template may be pre-defined by the API (e.g., certain delimiter or delimiters are required or prohibited). In other examples, a user interface may allow a user to define how placeholders within the initial prompt template are defined (not shown).

As shown, the user interface 300 includes a field 311, in this example a drop-down menu, in which the user can select the target model against which the prompt template will be used. The performance of different models can vary based on the prompt. Providing a target model allows the prompt template optimization service to evaluate prompt templates using the target model. In other examples, or when the user does not provide a target model, the prompt template optimization service may default to an existing hosted model 192, 194 having a similar type as the target model for the prompt (e.g., text to text, text to image, text to audio, etc.). The field 311 may present a list of common models, such as those models 192, 194 that are hosted by the machine learning service(s) and accessible to the user (e.g., publicly accessible models, models hosted by the user or user's organization, etc.). In some examples, a user interface may allow the user to specify a custom model (e.g., via a .tar.gz file including the model parameters), which the prompt template optimization service can temporarily launch (e.g., via model hosting services of the machine learning services) to support the evaluation of prompt templates during optimization.

As shown, the user interface includes fields 312, here illustrated as drop-down menus, in which the user can select functions for one or more of the different stages of a prompt template optimization workflow (e.g., variant generation, variant evaluation, and variant selection). Options within the drop-down menus may be based on the functions included within the functions library 142. As indicated above, in some cases the user may delegate function selection to the prompt template optimization service, shown here as an auto-selection option in the evaluation menu.

The user interface includes fields 314 and 316 in which the user can specify the locations of training and evaluation data, and field 318 in which the user can specify the location of the output (e.g., the optimized prompt template). In these examples, the location is specified as a "MY-STORE-ABC" location within a storage service of the cloud provider network, which may correspond to the job storage 170 of FIG. 1. In other examples, one or more of the training data, evaluation data, and output locations may be in separate storage locations.

The user interface includes fields 320 and 324 in which the user can specify stopping conditions, such as a maximum number of iterations of the workflow, when a score is reached (e.g., MSE below some value), or when the improvement of the prompt template plateaus such as shown such as when the score fails to improve by 1% over 25 iterations). The orchestrator 156 can evaluate the stopping condition(s) to determine when to output a prompt template optimization result (e.g., the final prompt template).

The user interface includes buttons 326 to allow a user to send a request to the prompt template optimization service 112 to create and/or run a prompt template optimization job.

FIG. 4 illustrates a request to create a prompt template optimization job directed to a programmatic interface of a prompt template optimization service, according to some examples. With reference to FIG. 1, the depicted create job request 400 is an exemplary prompt template optimization request 110 supported by the interface 122 of the prompt template optimization service 112. Some of the configuration settings specified in the request 400 can be those settings editable via the user interface 300 of FIG. 3.

As shown, in some examples, the create job request 400 may be specified in JSON format. In some examples, the request 400 may simply create configuration data for a new job in the job management database 138. In some examples, the request 400 may cause the new job to be executed. Because a prompt template optimization job can be long running, the solution to the job may not be returned in response to request 400. Rather, the response to request 400 may indicate a job identifier of the job that was created or initiated. The client can use this job identifier to monitor the progress of the job during execution. When the job completes, a notification may be provided asynchronously to the client that initiated the job, indicating the job identifier and optionally the optimized prompt template.

As shown in this example, request 400 includes a client identifier 402, such as a user name associated with an account submitting the request. The job name 404 may be an optional name for the job, which does not have to be unique. The job specification 406 is a container that specifies various job parameters. For example, this section may include the user provided prompt template 408, control (or stopping) conditions 410, and the selected functions 412, 414, 416 to use at various stages of a prompt template optimization workflow. The request 400 can include the target model 418 to indicate the model that the prompt template will be used with. The request 400 can specify the input 420 and output 422 data locations, such as the training and evaluation data, as well as any tags 424.

In some examples, the interface 122 (or API) of the prompt template optimization service may support many different types of API requests, in addition to the request 400 to create or execute a prompt template optimization job. For example, the API may support a request to cancel or stop a previously submitted or running job. The API may also support a request to list currently running or submitted jobs and return a list of job identifiers. The API may also support a describe job request that returns the configuration details of a particular job (e.g. the job parameters specified in request 400). In some embodiments, the API may allow clients to add additional tags to a job and remove tags from the job after the job's creation.

FIG. 5 illustrates a job status output by a programmatic interface of the prompt template optimization service, according to some examples. The depicted job status output 500 may be returned by the prompt template optimization service 112 as a response to a request submitted to the service (e.g. a request to get the status of a particular job), or an event that is sent by the service via an open session with the client that submitted the job when the job completes. In some embodiments, the job status output 500 may indicate some of the job configuration parameters of the job, including those parameters discussed in connection with FIG. 4.

As shown, in this example, the job status output indicates the job identifier 502 assigned to the job, which may be the unique job identifier assigned by the service. Additionally, the job status output 504 indicates a number of time-related items including the time when the job was first created, the time when the job started execution, the time when the job stopped executing (if available), and the total execution time of the job. The job status output 600 also indicates a status of the job which can change as the job progresses. In some embodiments, the job status flag may have a set of values such as: submitted, running, succeeded, failed, timed out, etc. The job status output in this example also indicates a percentage complete value of the job progress indicator. In some embodiments, this value may be determined based on an estimated completion time of the job, which may in some cases be generated by the associated orchestrator (e.g., estimated based on the current iteration relative to the maximum number of iterations). In some embodiments, the information contained in the job status output 500 can be displayed on a management interface of the prompt template optimization service to indicate the progress and current status of jobs submitted by a particular client or organization, accessible via the interface 122.

As shown, the status output 600 can indicate the location 506 of the execution log 176, which is used to log different types of execution data during the job execution. For example, the execution log may include data such as, for each iteration, the variants generated, their associated scores, and the prompt template used for the next iteration, as well as start and stop times for each iteration.

Figure 6:
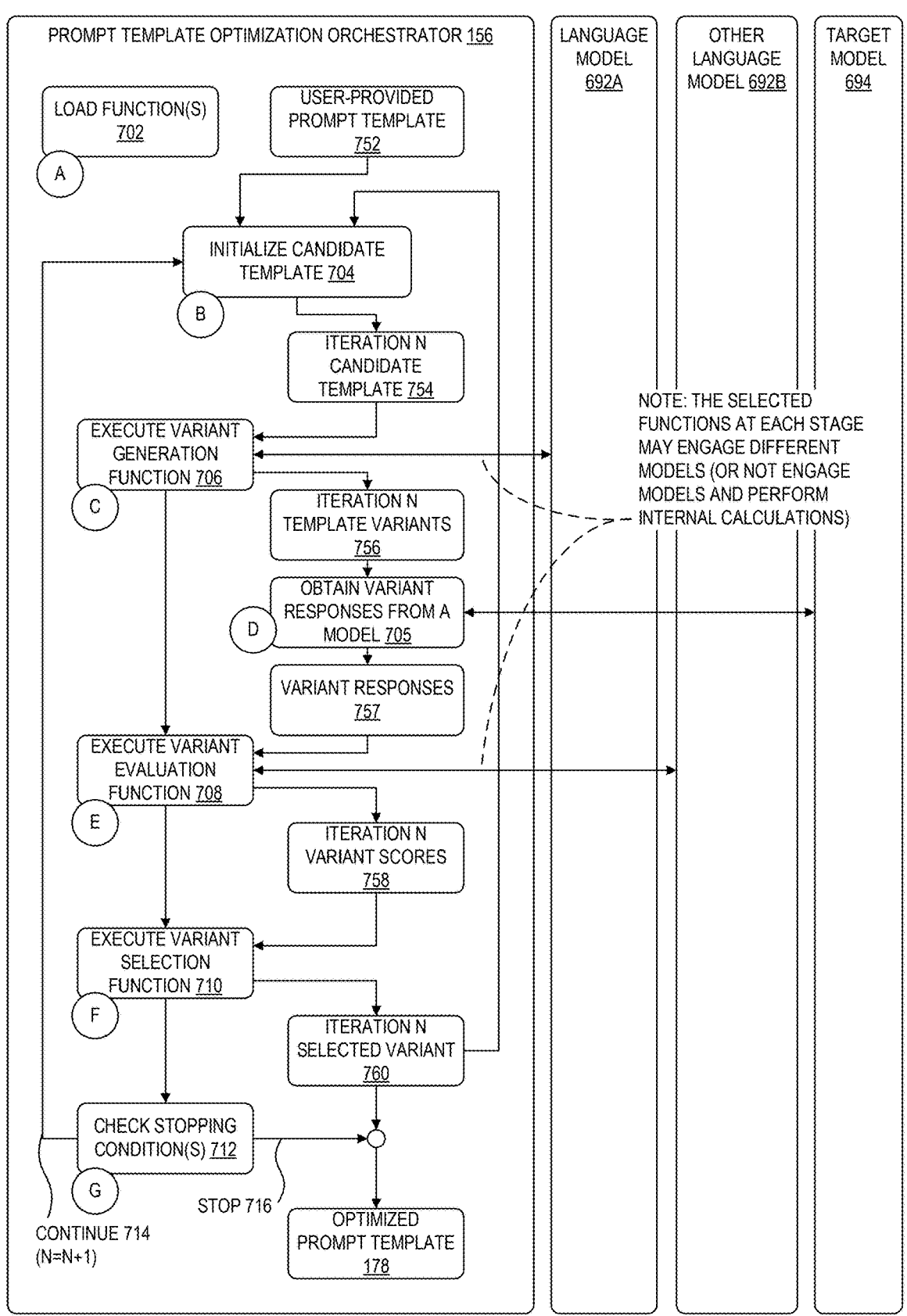
FIG. 6 illustrates operations of a prompt template optimization orchestrator, according to some examples.

FIG. 6 illustrates operations of a prompt template optimization orchestrator, according to some examples. The prompt template optimization orchestrator 156 performs operations that form a prompt template optimization workflow. At a high level, the workflow takes as an input an initial prompt template and outputs an optimized prompt template.

The workflow operations that yield the optimized prompt template from the initial prompt template can be subdivided into stages, each of which may be customizable by a selectable function that include all or portion of the instructions for the stage. An exemplary set of stages include prompt template variant generation, prompt template variant evaluation, and prompt template variant selection.

Exemplary workflow operations are now described with reference to the encircled letters A through G in FIG. 6. Models 692A, 692B, and 694 are typically GAI models, such as those hosted within a cloud provider network (e.g., by the model hosting compute instances 190 of FIG. 1). Each stage may or may not engage a model. Additionally, when different stages do engage a model, different stages may engage different models.

At circle A, the orchestrator 156 performs load function 702 operations that customize the prompt template optimization workflow. In some examples, the loaded functions can be those indicated by selections within a prompt template optimization request. In other examples, such as when the prompt template optimization request selects the auto-selection of one or more functions or when the functions associated with one or more stages of the workflow are hidden from a user, the orchestrator can evaluate the prompt characteristics (e.g., such as by prompting a language model) and select functions that match those characteristics.

As indicated above, the functions can be loaded from a function library in remote storage or from a locally stored function library (again, subject to whether the function library can fit on the hosting compute instance). In some examples, the operations 702 may be omitted such as when a custom image including an orchestrator tailored with a particular set of functions is used to launch the compute instance.

At circle B, the orchestrator 156 performs initialization operations 704 to initialize a candidate prompt template 754 to be used for the current iteration of the workflow. In some examples, the candidate prompt can be considered a "seed" that will be used as the basis for variant generation. In the first iteration (e.g., such as where a workflow iteration counter N is initialized to 1), the candidate prompt template can be set as the user-provided prompt template 752, such as provided in the prompt template optimization request. In subsequent iterations (e.g., such as where the iteration counter N has been incremented above the initial value), the candidate prompt can be set to the selected prompt template variant 760 from the previous iteration (e.g., at iteration N=8, the candidate prompt is the selected prompt from iteration N=7).

At circle C, the orchestrator 156 performs operations 706 to execute the variant generation function to generate prompt template variants 756 for the iteration. As described above, various techniques can be used to generate prompt template variants, such as the examples provided in variant generation functions 200 of FIG. 2. In this example, the orchestrator 156 bases its variant generation off an output from the language model 192A. Note that the output may be a response to a meta-prompt that includes the variant generation, or may be based on a numeric calculation of a loss and backpropagation through the model 192A to identify tokens (e.g., words) within a prompt template contributing to the loss.

At circle D, the orchestrator 156 performs operations 705 to obtain responses 757 from a model using the previously generated prompt template variants. The model may be a targeted model that will be used with the optimized prompt template, the language model 192A used to generate the prompt template variants, or another model. In this example, the model is a target model 694, which may be specified as part of a prompt template optimization request. As part of obtaining responses, the orchestrator 156 can convert the prompt template into a prompt by substituting in example data (e.g., from the training/evaluation data 174) into the placeholder(s) of the prompt template variants. The orchestrator 156 can store these responses for each {prompt template variant, example data}-tuple as responses 757.

At circle E, the orchestrator 156 performs operations 708 to evaluate the responses 757 using a variant evaluation function to generate scores for the prompt template variants. As described above, various techniques can be used to evaluate prompt template variants, such as the examples provided in variant evaluation functions 220 of FIG. 2. As shown, the operations 708 may obtain scores from a language model, such as the other language model 692B. In other examples, scores may be obtained from the same language model 692 that generated the prompt template variants.

In other examples, the score can be calculated without using a model such as models 692A, 692B. For example, the operations 708 can use a loss function to compare a label in the training data associated with an example used to populate a prompt template with the associated response. As another example, the operations 708 can measure the similarity between the example and the response (e.g., for summarization tasks). As yet another example, the operations 708 can score the responses with a measurement of the quality of the output (e.g., for media generation tasks).

At circle F, the orchestrator 156 performs operations 710 to select a "best" or "optimal" variant 760 for the iteration. As described above, various techniques can be used to select a prompt template variant from the prompt template variants, such as the examples provided in variant selection functions 240 of FIG. 2. In the relatively linear example workflow depicted here, the operations 710 may select the variant with the best or highest score 758. In other examples, the operations described above with reference to circle D and E can be part of the selection. For example, in the tournament- or bandit-selection approaches, the selection (or elimination) of variants may occur as the responses 757 to populated variant templates are obtained and scored.

At circle G, the orchestrator 156 performs operations 712 to check whether a stopping condition of potentially many stopping conditions is satisfied. If no stopping condition is satisfied, the workflow continues 714 with the next iteration. Otherwise, the orchestrator stops 716 iterating and stores or otherwise outputs the selected prompt template variant 760 as "best" or "optimal" template 178 from the prompt template optimization job.

Exemplary stopping conditions include a maximum number of iterations, a plateau condition, or a score condition. A plateau condition may be a condition that indicates that the performance of the prompt variant over some number of iterations must continue to improve beyond some threshold. For example, a score improvement threshold may be measured as a relative improvement (e.g., 3%) over some number of iterations (e.g., 25 iterations). The orchestrator 156 can maintain the score associated with the best variants selected across iterations and determine whether to continue iteration or not, such as when the score improvement threshold is not satisfied.

A score condition may be set that indicates when the score achieves a certain threshold, the iterations can stop. For some scoring techniques, the score may approach a known value (e.g., from 0 to 1). For example, if the model score is an accuracy metric measured from 0 to 1 where 1 is perfect, a score threshold of 0.95 may be set as a stopping condition such that when the score threshold is satisfied, the orchestrator stops iterating through the workflow.

FIG. 7 is a flowchart illustrating operations 700 of a method for prompt template optimization with language models according to some examples. Some or all of the operations 700 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the prompt template optimization service 112 of the other figures.

The operations 700 include, at block 702, receiving a prompt template optimization request to optimize a generative artificial intelligence model prompt template, the prompt template optimization request including an initial prompt template and an indication of a selected function, the selected function to implement at least a portion of a prompt template optimization workflow.

The operations 700 further include, at block 704, processing the prompt template optimization workflow with the selected function, wherein the prompt template optimization workflow includes one or more iterations of generating, evaluating, and selecting prompt template variants based at least in part on the initial prompt template to yield a final prompt template.

The operations 700 further include, at block 706, outputting the final prompt template.

Illustrative Systems

Figure 8:
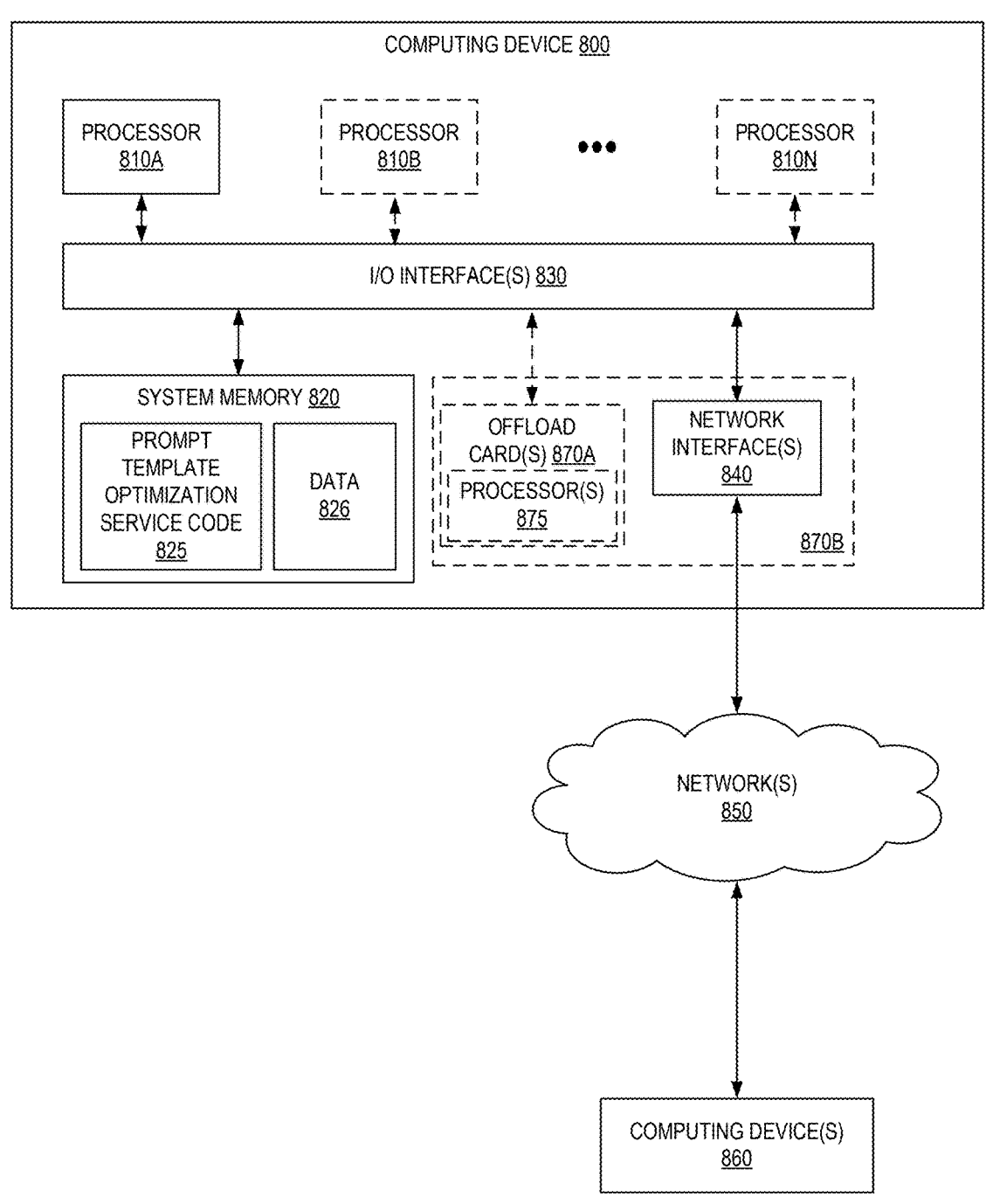
FIG. 8 is a block diagram illustrating an example computing device that can be used in some examples.

In some examples, a system that implements a portion or all of the techniques described herein can include a general-purpose computer system, such as the computing device 800 (also referred to as a computing system or electronic device) illustrated in FIG. 8, that includes, or is configured to access, one or more computer-accessible media. In the illustrated example, the computing device 800 includes one or more processors 810 coupled to a system memory 820 via an input/output (I/O) interface 830. The computing device 800 further includes a network interface 840 coupled to the I/O interface 830. While FIG. 8 shows the computing device 800 as a single computing device, in various examples the computing device 800 can include one computing device or any number of computing devices configured to work together as a single computing device 800.

In various examples, the computing device 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as prompt template optimization service code 825 (e.g., executable to implement, in whole or in part, the prompt template optimization service 112) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computing device 800 and other computing devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computing device 800. However, in some examples the virtualization manager implemented by the offload card(s) 870A or 870B can accommodate requests from other entities (e.g., from compute instances themselves), and cannot coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 192A-192N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
  receiving a prompt template optimization request to optimize a generative artificial intelligence model prompt template, the prompt template optimization request including an initial prompt template and an indication of a selected function, the selected function to implement at least one of a prompt template variant generation function, a prompt template variant evaluation function, or a prompt template variant selection function, wherein the initial prompt template includes instructions for a generative artificial intelligence model to generate a response;
  executing an orchestrator application to process a prompt template optimization workflow with the selected function, wherein the execution includes one or more iterations of:
    generating a plurality of prompt template variants from a candidate prompt template using the prompt template variant generation function, the candidate prompt template initialized in a first iteration based on the initial prompt template,
    evaluating the plurality of generated prompt template variants to generate a score associated with each prompt template variant using the prompt template variant evaluation function, and
    selecting, based on the generated scores, a generated prompt template variant to be used as the candidate prompt template in a next iteration or as a final prompt template when a stopping condition is reached using the prompt template variant selection function; and
  outputting the final prompt template.

2. The computer-implemented method of claim 1 performed by a service of a cloud provider network and further comprising provisioning a compute instance in the cloud provider network to execute the orchestrator application.

3. The computer-implemented method of claim 1, wherein the stopping condition is a maximum number of iterations or when a score improvement over a number of iterations fails to satisfy a score improvement threshold.

4. A computer-implemented method comprising:
  receiving a prompt template optimization request to optimize a generative artificial intelligence model prompt template, the prompt template optimization request including an initial prompt template and an indication of a selected function, wherein the initial prompt template includes instructions for a generative artificial intelligence model to generate a response;
  processing a prompt template optimization workflow with the selected function, wherein the prompt template optimization workflow includes one or more iterations of generating, evaluating, and selecting prompt template variants based at least in part on the initial prompt template to yield a final prompt template and wherein an iteration of the one or more iterations comprises:
    generating prompt template variants using a prompt template variant generation function;
    evaluating the prompt template variants using a prompt template variant evaluation function; and
    selecting from the prompt template variants using a prompt template variant selection function, wherein the selected function indicates at least one of the prompt template variant generation function, the prompt template variant evaluation function, or the prompt template variant selection function; and
  outputting the final prompt template.

5. The computer-implemented method of claim 4, further comprising executing an orchestrator application to process the prompt template optimization workflow, and wherein the generating includes obtaining, from a language model, a plurality of prompt template variants based at least in part on a candidate prompt, the candidate prompt initialized in a first iteration of the workflow based on the initial prompt template.

6. The computer-implemented method of claim 5, wherein the evaluating includes obtaining, from the language model or another model, responses to each of the plurality of prompt template variants populated with at least a training data example, the training data example inserted into a placeholder within the prompt template variants.

7. The computer-implemented method of claim 6, wherein selecting includes selecting, based at least in part on the obtained responses, a generated prompt variant or a combination of generated prompt variants to be used as the candidate prompt in a next iteration of the workflow or as a final prompt when a stopping condition is reached.

8. The computer-implemented method of claim 7, wherein the evaluating further includes scoring each of the obtained responses with a hard evaluation metric or with the language model.

9. The computer-implemented method of claim 7, wherein the stopping condition is a maximum number of iterations or when a score improvement over a number of iterations fails to satisfy a score improvement threshold.

10. The computer-implemented method of claim 5 performed by a service of a cloud provider network and further comprising provisioning a compute instance in the cloud provider network to execute the orchestrator application, and wherein the language model is hosted by other resources of the cloud provider network.

11. The computer-implemented method of claim 5, further comprising, by the orchestrator application, loading the selected function from a function library, wherein the selected function includes instructions to perform at least a portion of at least one of the generating, evaluating, or selecting operations of the prompt template optimization workflow.

12. The computer-implemented method of claim 11, wherein the selected function includes instructions to perform at least a portion of the generating of the prompt template optimization workflow, the selected function including a meta-prompt template, the meta-prompt template including a placeholder for the candidate prompt and instructions to generate a variant or the candidate prompt.

13. The computer-implemented method of claim 11, wherein the selected function includes instructions to perform at least a portion of the selecting of the prompt template optimization workflow, the selected function including instructions to rank the plurality of prompt template variants.

14. A system comprising:

a first one or more computing devices of a prompt template optimization service in a cloud provider network, the prompt template optimization service including instructions that upon execution cause the prompt template optimization service to:

receive a prompt template optimization request to optimize a generative artificial intelligence model prompt template, the prompt template optimization request including an initial prompt template and an indication of a selected function, wherein the initial prompt template includes instructions for a generative artificial intelligence model to generate a response, and outputting a final prompt template; and a second one or more computing devices to process a prompt template optimization workflow with the selected function, wherein the prompt template optimization workflow includes instructions to perform one or more iterations of generating, evaluating, and selecting prompt template variants based at least in part on the initial prompt template to yield the final prompt template and wherein an iteration of the one or more iterations comprises:

generating prompt template variants using a prompt template variant generation function;

evaluating the prompt template variants using a prompt template variant evaluation function; and selecting from the prompt template variants using a prompt template variant selection function, wherein the selected function indicates at least one of the prompt template variant generation function, the prompt template variant evaluation function, or the prompt template variant selection function.

15. The system of claim 14, wherein the second one or more computing devices include instructions of an orchestrator application to process the prompt template optimization workflow, and wherein the prompt template optimization workflow instructions to perform the generating include instructions to obtain, from a language model, a plurality of prompt template variants based at least in part on a candidate prompt, the candidate prompt initialized in a first iteration of the workflow based on the initial prompt template.

16. The system of claim 15, wherein the prompt template optimization workflow instructions to perform the evaluating include instructions to obtain, from the language model or another model, responses to each of the plurality of prompt template variants populated with at least a training data example, the training data example inserted into a placeholder within the prompt template variants.

17. The system of claim 16, wherein the prompt template optimization workflow instructions to perform the selecting include instructions to select, based at least in part on the obtained responses, a generated prompt variant or a combination of generated prompt variants to be used as the candidate prompt in a next iteration of the workflow or as a final prompt when a stopping condition is reached.

18. The system of claim 17, wherein the prompt template optimization workflow instructions to perform the evaluating include instructions to score each of the obtained responses with a hard evaluation metric or with the language model.

19. The system of claim 17, wherein the stopping condition is a maximum number of iterations or when a score improvement over a number of iterations fails to satisfy a score improvement threshold.

20. The system of claim 15, wherein the instructions of the orchestrator application include instructions to load the selected function from a function library, wherein the selected function includes instructions to perform at least a portion of at least one of the generating, evaluating, or selecting operations of the prompt template optimization workflow.

* * * * *